Aug. 14, 1945.  M. WATTER  2,382,950
AIRCRAFT STRUCTURE
Filed Sept. 14, 1942  2 Sheets-Sheet 1

INVENTOR
Michael Watter
BY John P Tarbox
ATTORNEY

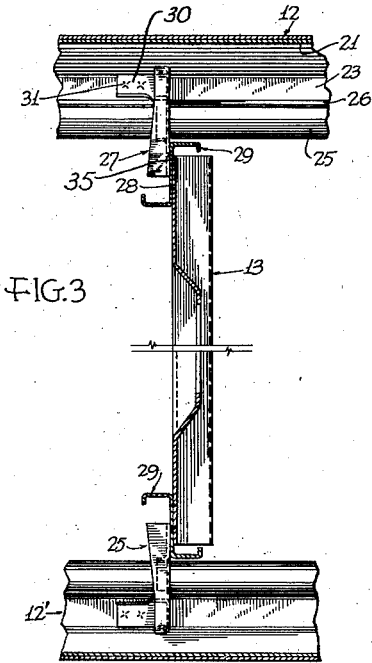
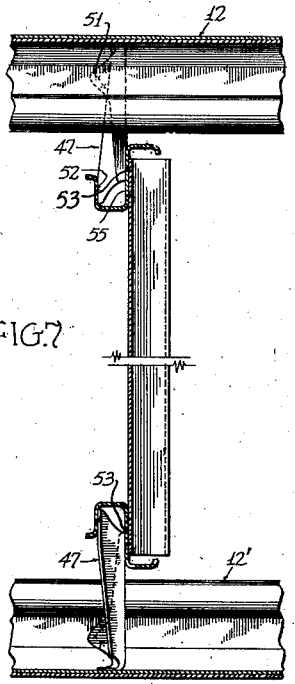
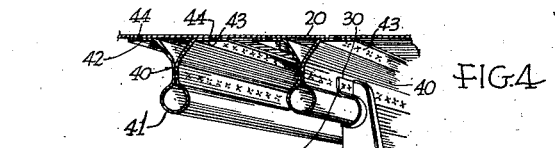
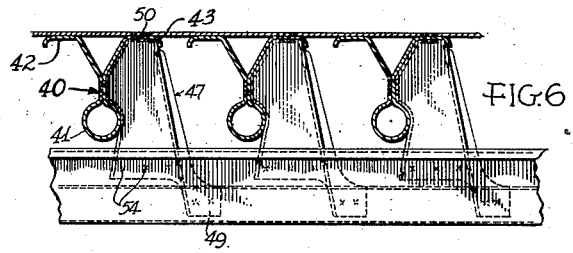
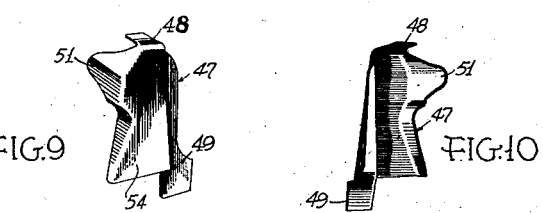
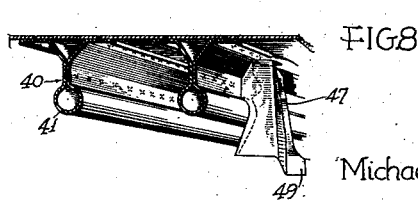
INVENTOR
Michael Watter.
BY John P Jarbox
ATTORNEY Patented Aug. 14, 1945

2,382,950

UNITED STATES PATENT OFFICE 2,382,950

AIRCRAFT STRUCTURE

Michael Watter, Philadelphia, Pa., assignor to Edward G. Budd Manufacturing Company, Philadelphia, Pa., a corporation of Pennsylvania Application September 14, 1942, Serial No. 458,251

15 Claims. (Cl. 244—123)

This invention relates to airfoil structures and more particularly to the formation of the skin blanket assembly and to means for attaching the same to chord-wise extending ribs. This application is a continuation-in-part of my pending application, Serial No. 385,235, filed March 26, 1941.

It is an object of the present invention to provide a novel reinforcing structure for skin sheets and one in which the same is so formed that it may be easily secured to the rib structure of the airfoil by a welding operation.

It is another object of the invention to provide a novel attaching clip so formed as to be readily attachable to the skin supporting structure and allowed to project into face to face relationship with a side face of a rib for securement thereto.

It is still another object of the invention to provide an attaching clip for skin blanket assemblies which is particularly adapted for attachment to S-shaped cap strips, forming a part of the rib assemblies.

According to the present invention, there is provided a series of channel members serving to support the skin sheet and having inwardly extending flanges or face portions. The channel members and their flanges, run spanwise of the skin sheet. Adapted to be disposed between adjacent flanges of two adjacent channel members for securement thereto is a strengthening stringer of tubular shape. For the attachment of this skin blanket assembly to a rib structure, there is provided attaching clips adapted to be attached to the inwardly extending flanges and adapted to extend into face to face engagement with a side face or cap strip of the rib assembly. The welding of the skin blanket assembly to the rib is thus made by the welding together of the face portions of the attaching clips and of the rib cap strips. These attaching clips are so connected that they are subjected to the full load of the skin blanket as impressed upon the rib assemblies. Each of the attaching clips has an arcuate portion adapted to be seated about the tubular stringer upon the same being connected to the inwardly extending flange portions of the channel-shaped members. Further, in connection with the invention, there has been provided a form of attaching clip which is particularly adapted for the attachment of a skin blanket assembly to an S-shaped cap strip, and one adapted to be connected to two opposed faces of the cap strip.

For other objects and for a better understanding of the invention, reference may be had to the following detailed description taken in connection with the accompanying drawings in which:

Fig. 3 is a fragmentary view in section of the skin blanket and rib assembly showing the attachment of the skin blanket supporting structure with the rib;

Fig. 4 is a perspective view of a skin blanket assembly showing a modified form of supporting structure with an attaching clip secured thereto;

Fig. 5 is a perspective view of an attaching clip;

Fig. 6 is a sectional view of the skin supporting structure shown in Fig. 4 with a modified cap strip and an attaching clip of a modified form;

Fig. 7 is a view similar to Fig. 3 in section showing the modified form of the attaching clip securing the same to the first form of skin blanket assembly and a modified cap strip;

Fig. 8 is a perspective view similar to Fig. 4 of the modified form of skin supporting structure with the modified form of attaching clip;

Figs. 9 and 10 are perspective views taken from different angles of the modified attaching clip alone.

Figure 1:
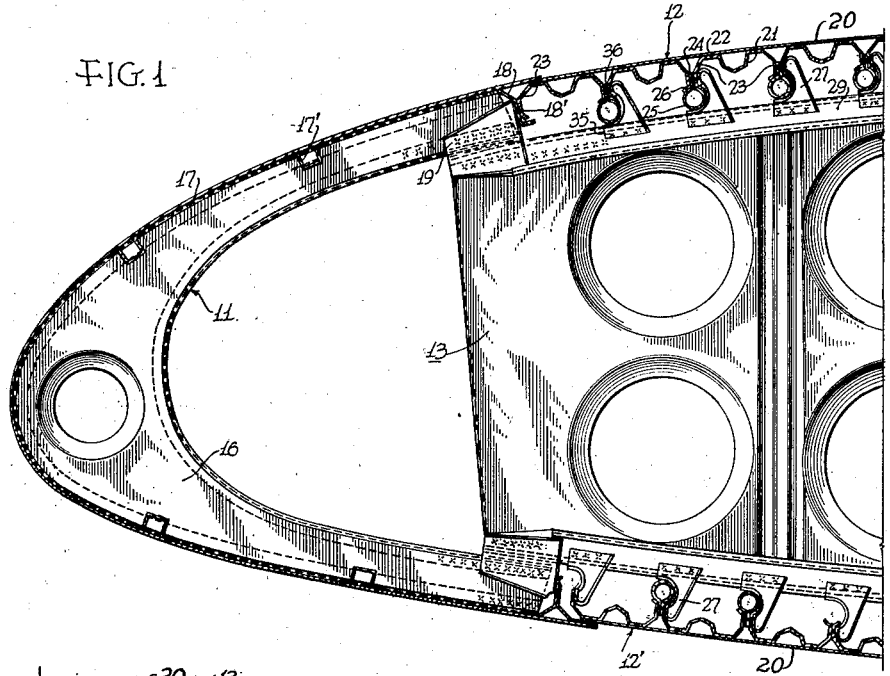
Figure 1 is a cross sectional view of the forward portion of an airfoil structure, showing a rib, skin blanket, and leading edge assemblies and their attachment to the rib.
Figure 2:
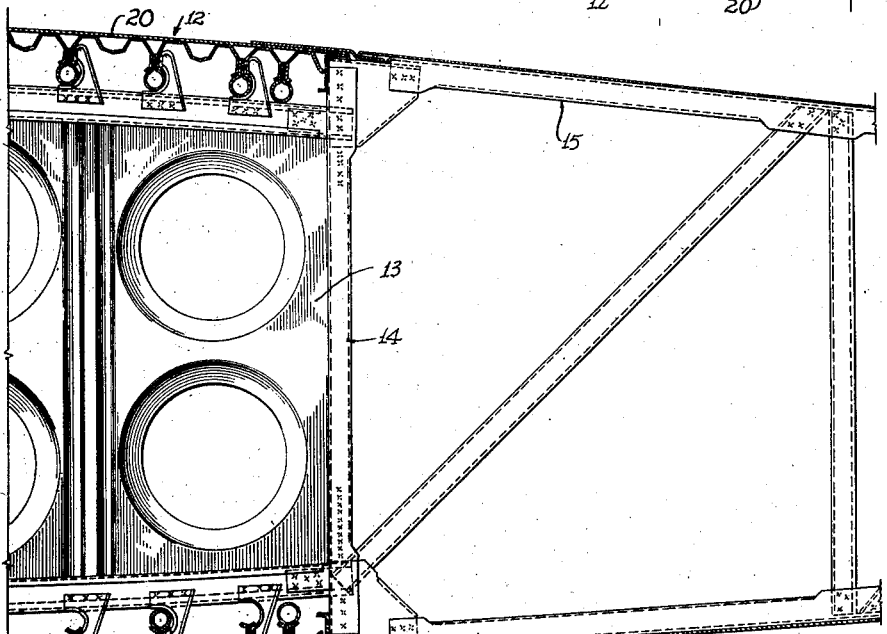
Fig. 2 is a cross sectional view of the airfoil structure taken at the same station as that of Fig. 1 but of the rearward portion of the airfoil structure.

Referring now particularly to Figs. 1 and 2 there is shown generally, a leading edge assembly 11, top and bottom skin blanket assemblies 12 and 12', a chord-wise extending rib 13, a spar structure 14 and a trailing edge assembly 15.

The leading edge assembly 11 is composed of a nose forming rib 16 and a skin sheet 17 reinforced with a series of spanwise extending hat-shaped elements 17'. Connected to the rearward edge of the skin sheet 17 and to the nose forming rib 16 thereof is a spanwise extending attaching portion 18 and an attaching piece 19 for the rib assembly 13.

The skin blanket assemblies 12 and 12', include a skin sheet 20 and a supporting structure of channel-shaped reinforcing elements 21 arranged to support the skin sheet 20, the same being connected thereto as indicated by welding at 22. Each of these channel-shaped elements has inwardly extending flange portions 23. Disposed between adjacent flange portions of adjacent channel-shaped members are radially extending portions 24 of tubular stringers 25. Formed on the flange portions 23 are seats 26 adapted to receive the tubular part of the stringers. These tubular stringers extend spanwise of the skin blanket and serve to reinforce considerably and form a part of the skin blanket supporting structure.

Referring now also to Figs. 3 and 5 there will be noted the formation of attaching clips 27 which are utilized for the securing of the skin blanket assembly to a side face portion 28 of a cap strip 29 forming a part of the rib assembly 13. These attaching clips 27 having a transversely extending attaching portion 30 adapted to fit against one of the flanges 23 for securement thereto by the welds 31. These attaching clips are preferably welded to the skin blanket assembly prior to the skin blanket assembly being attached to the rib assemblies. The attaching portion 30 lies above an arcuate portion 32 formed to fit about the tubular stringers 25 and to serve as a seat for the same. This arcuate portion 32 is of flange-shape and runs with the stringer and parallel to the reinforcing edge portion 33 both of which give to the attaching clip, which is of sheet metal, added strength and rigidity. Adapted to extend below and into face to face engagement with the side face 28 of the cap strip 29 is an attaching portion 34. When the skin blanket assembly 12 is put in place and the rib structure 13 is brought into its proper relationship with the skin blanket assembly and with the leading edge section 11, the attaching clips 27 will be in proper alignment for the welding of the same to the cap strip 29 and for the welding of the attaching piece 19 of the leading edge assembly with the cap strip 29. The welding of the attaching clips 27 is as indicated at 35. Also on one side there is a welding of a flange 23 of the forwardmost channel member with the spanwise extending attaching strip 18 of the leading edge assembly, as indicated at 18'. On the other side there is a similar connection with an inserted flange piece.

In the attachment of the attaching clip 27 by means of its transversely extending portion 30 to the flange 23 of a channel-shaped member, it will be noted that the same is performed by the same welding operation that the flange portions 23 are welded to the radially extending portions of the tubular stringer 25. This common welding means is indicated at 31. It should be apparent that the lower skin blanket assembly 12' is of similar construction as that of the skin blanket assembly 13 and that the same is similarly attached to the rib assembly 13 and to the leading edge asesmbly 11.

Referring now to Fig. 4 there will be noted a modified form of skin supporting structure for supporting the skin sheet 20 of a skin blanket assembly 12 or 12'. The skin supporting structure includes a series of spaced reinforcing elements 40, each of which is formed of sheet material folded back against itself to leave a tubular or hollow portion at its apex 41 and flared at its open end to provide laterally spaced attaching flanges 42 and 43. These reinforcing elements are attached to the skin sheet by means of their flanges 42 and 43 as by welding as indicated at 44. The tubular or hollow portion 41 is of similar dimension as that of the tubular stringers in the form of the invention just described about which can be attached the regular attaching clip 27. The attaching portion 30 for the clip 27 is welded to the reinforcing elements 40 by the same welding that retains the sheet material which forms the same in its folded back formation. This welding means is indicated at 45.

Coming now to a modified form 47 of attaching clip which is particularly adapted for use in the connecting of the skin blanket assembly to cap strips of S-shape, it will be noted particularly in Figs. 9 and 10 that the attaching clip is formed with the additional flanges or attaching portions 48 and 49. It will also be noted that the attaching clip 47 itself is of greater length than the attaching clip 27. With this additional length it will be seen the attaching portion 48 can seat against the inner face of the skin-supporting elements for attachment of the clip directly to the skin sheet through merely the thickness of the skin-supporting elements. This is done by the welding as indicated at 50. This attachment of the portion 48 is made as well as the attachment of a portion 51, corresponding to the attaching portion 30 of the attaching clip 27, which is welded to the reinforcing elements at a location inwardly of their connection with the skin sheet proper.

The attaching portion 49 is to provide an additional face on the attaching clip for connection with an opposite face 52 of an S-shaped cap strip 53. A connection is also made of an attaching portion 54, corresponding to the attaching portion 34 of the attaching clip 27, with a main face 53 of the cap strip 52. Figs. 6 and 8 show the connection of a modified form of the attaching clip made in connection with the modified form of skin-reinforcing structure whereas Fig. 7 shows the modified attaching clip connected to the form of reinforcing structure shown in Figs. 1, 2 and 3.

It should now be apparent that there has been provided a skin blanket assembly including a skin sheet with a supporting structure which is so formed that the same can be readily attached to a rib structure merely by the use of pressed metal attaching clips, and these clips being so formed as to withstand and to transmit the load from the skin blanket assembly to the rib assembly forming a part of the frame of the airfoil structure.

While various changes may be made in the detailed construction of the arrangement and of the attaching clip serving for the connection of the skin blanket assembly to the rib assembly, it shall be understood that such changes are within the spirit and scope of the present invention as defined by the appended claims.

What is claimed is:

1. In an airfoil structure, a plurality of spaced chordwise extending ribs, a skin blanket embodying a skin sheet and a plurality of spanwise extending stringers secured to said skin sheet, the skin blanket being disposed entirely above the ribs, a plurality of attaching portions extending from said stringers in lapped relation with vertical side faces of said ribs, and means for securing said attaching portions to said ribs through said side faces, the stringers having their lowermost parts disposed in a surface located at a distance from a parallel surface defining the uppermost adjacent parts of the ribs so that the attaching portions form strut-like connections between the stringers and ribs, whereby the skin blanket may be shifted longitudinally along the length of the ribs or transversely along the width of the ribs to take up an adjusted position in making connection between the skin blanket and the ribs, and whereby the attaching means are subjected to load during flight.

2. In air airfoil structure, a plurality of chordwise extending ribs, a skin blanket embodying a skin sheet and a plurality of spanwise-extending parallel stringers of thin gauge sheet metal, said skin sheet standing clear above said ribs, and means for securing the skin blanket to said ribs comprising a plurality of metal members each secured to one side only and projecting from said stringers and secured to the vertical sides of said ribs, the stringers having their lowermost parts disposed in a surface located at a distance from a parallel surface defining the uppermost adjacent parts of the ribs so that the attaching members form strut-like connections between the stringers and ribs, whereby the skin blanket may be shifted longitudinally along the length of the ribs or transversely along the width of the ribs to take up an adjusted position in making connection between the skin blanket and the ribs, and whereby the attaching members are subjected to load during flight.

3. In an airfoil structure, a plurality of chordwise extending ribs, a skin blanket embodying a skin sheet and a plurality of spanwise extending parallel stringers having a portion of tubular shape in cross-section, said stringers being of thin gauge sheet metal, the skin blanket standing clear above said ribs and having no direct connection thereto, and means for securing the skin blanket to said ribs comprising a plurality of metal members each secured to one side only and projecting from said stringers and means for rigidly securing said metal members to said ribs, each of said metal members having an arcuate seat portion firmly engaging the stringer to which it is attached, the stringers having their lowermost parts disposed in a surface located at a distance from a parallel surface defining the uppermost adjacent parts of the ribs so that the attaching members form strut-like connections between the stringers and ribs, whereby the skin blanket may be shifted longitudinally along the length of the ribs or transversely along the width of the ribs to take up an adjusted position in making connection between the skin blanket and the ribs, and whereby the attaching members are subjected to load during flight.

4. In an airfoil structure, a reinforced skin blanket comprising a thin gauge metal skin sheet, a plurality of reinforcing channels having their bases secured to said skin sheet, adjoining channels having their adjacent side portions in closely spaced parallel relation, and tubular stringers of thin gauge sheet metal having radially extending portions disposed between the closely spaced channel side portions and securely welded thereto.

5. In an airfoil structure, a reinforced skin blanket comprising a thin gauge metal skin sheet, a plurality of reinforcing elements each formed of thin gauge sheet metal, each of said elements comprising a tubular portion having abutting radial flange portions secured together adjacent the tubular portion thereof and extending in divergent relation toward the skin sheet and terminating in opposed flanges secured to said skin sheet.

6. In an airfoil structure, a reinforced skin blanket comprising a thin gauge metal skin sheet, a plurality of reinforcing elements each formed of thin gauge sheet metal, each of said elements comprising a tubular portion having abutting radial flange portions welded together adjacent the tubular portion thereof and extending in divergent relation toward the skin sheet and terminating in opposed flanges secured to said skin sheet, and a plurality of blanket attaching members secured to said elements at points of attachment to a supporting frame.

7. In an airfoil structure, a chordwise extending rib, a skin blanket assembly including a skin sheet, a plurality of channel-shaped stringer members for supporting the skin sheet and having inwardly extending portions, adjacent inwardly extending portions of the respective channels being secured together to provide spanwise extending stringer portions, attaching clips secured to the stringer portions and adapted to extend into engagement with the chordwise extending rib, and means for securing the attaching clips to the ribs, the stringer members having their lowermost parts disposed in a surface located at a distance from a parallel surface defining the uppermost adjacent parts of the ribs so that the attaching clips form strut-like connections between the stringer members and ribs, whereby the skin blanket may be shifted longitudinally along the length of the ribs or transversely along the width of the ribs to take up an adjusted position in making connection between the skin blanket and the ribs, and whereby the attaching clips are subject to load during flight.

8. In a airfoil structure, a chordwise extending rib, a skin blanket assembly including a skin sheet, a plurality of channel-shaped members for supporting the skin sheet and running spanwise thereof, each of said channel-shaped members having inwardly extending flanges, the channel-shaped members arranged with a flange of one adjacent to a flange of another, strengthening stringer elements having portions adapted to be disposed between adjacent flanges, attaching clips for securing the skin blanket assembly to the rib, said clips having portions positioned alongside said flanges, and means for securing together adjacent flanges, strengthening stringer element portions, and the attaching clips.

9. In an airfoil structure, a chordwise extending rib, a reinforced skin blanket assembly including a skin sheet, a plurality of spanwise extending reinforcing elements formed of sheet metal, said elements including a tubular portion having abutting radial flange portions secured together adjacent the tubular portion and portions extending in divergent relation toward the skin sheet and terminating in oppositely disposed flanges secured to said skin sheet, attaching clips for securing the skin blanket assembly to the chordwise extending rib, said attaching clips being shaped to fit about the tubular portion and having an attaching portion for securement of the clip to the reinforcing element in the region in which the abutting radial flange portions are secured together.

10. In an airfoil structure, a chordwise extending rib, a reinforced skin blanket assembly including a thin gauge metal skin sheet and a plurality of spanwise extending reinforcing elements formed of sheet metal, said elements including a tubular portion having abutting radial flange portions secured together adjacent the tubular portion thereof and portions extending in divergent relation toward the skin sheet and terminating in oppositely extending flanges secured to said skin sheet, attaching clips for securing the skin blanket assembly to the chordwise extending rib, said attaching clips being contoured to fit about one-half of a face of the reinforcing element and having attaching portions for securing the same to the reinforcing elements in the region of the securing of the radial flange portions together and also in the region of securement of the flange with the skin sheet.

11. In an airfoil structure, a chordwise extending rib, a reinforced skin blanket assembly including a skin sheet and a reinforcing structure secured to the skin sheet and having spanwise extending reinforcing portions with faces extending normal of the blanket assembly, attaching clips for securing the skin blanket assembly to the chordwise extending rib, and each of said attaching clips contoured to fit a face of the spanwise extending reinforcing portions and having attaching portions projected respectively for securement with the reinforcing portions at a location inwardly removed from the skin sheet and also at the location of securement of the reinforcing portions with the skin sheet, the skin reinforcing structure having its lowermost parts disposed in a surface located at a distance from a parallel surface defining the uppermost adjacent parts of the ribs so that the attaching clips form strut-like connections between the skin reinforcing structure and ribs, whereby the skin blanket may be shifted longitudinally along the length of the ribs or transversely along the width of the ribs to take up an adjusted position in making connection between the skin blanket and the ribs, and whereby the attaching clips are subjected to load during flight.

12. In an airfoil structure, a chordwise extending rib having a cap strip of a shape providing a channel open toward the outside at the rib attaching edge and with opposed side faces, a reinforced skin blanket assembly including a skin sheet and having spanwise reinforcing portions with faces extending normal to the skin sheet, attaching clips for securing the skin blanket assembly to the chordwise extending rib, each of said attaching clips being secured to the face of a reinforcing portion and having spaced attaching portions projected into the open channel of the cap strip and secured respectively with the opposed faces thereof.

13. In an airfoil structure, a chordwise extending rib having a cap strip of a shape providing a channel open toward the outside at the rib attaching edge and with opposed side faces, a reinforced skin blanket assembly including a skin sheet and having spanwise reinforcing portions with faces extending normal to the skin sheet, attaching clips for securing the skin blanket assembly to the chordwise extending rib, each of said attaching clips being contoured to fit a face of the spanwise extending reinforcing portions and provided with means for securing the clips to the reinforcing portions at a location inwardly removed from the skin sheet and at a location adjacent to the securement of the reinforcing portions with the skin sheet, each of said attaching clips being further secured to the face of a reinforcing portion and having spaced attaching portions projected into the open channel of the cap strip and secured respectively with the opposed faces thereof.

14. In an airfoil structure in combination, stringer and rib elements disposed transversely of each other, a skin sheet secured to said stringer elements, said stringer elements including a web portion extending away from the rib elements and also including overhanging lateral portions adjacent the rib elements, and clips for securing stringer elements to rib elements, each clip including a portion lying alongside and secured to one face of the web portion of the stringer element, a portion lying alongside and secured to a vertical side face of a rib element, and a portion extending past said overhanging stringer portion, all parts of said clip being disposed on one side of said stringer element, the stringer elements having their lowermost parts disposed in a surface located at a distance from a parallel surface defining the uppermost adjacent parts of the ribs so that the attaching clips form strut-like connections between the stringer elements and ribs, whereby the skin sheet and its attached stringer elements may be shifted longitudinally along the length of the ribs or transversely along the width of the ribs to take up an adjusted position in making connection between the stringer elements and ribs, and whereby the attaching clips are subjected to load during flight.

15. In an airfoil structure in combination, stringer and rib elements disposed transversely of each other in different planes, a skin sheet secured to the stringer elements distant from said rib elements, said stringer elements including web portions extending away from the rib elements and skin sheet respectively and also including overhanging lateral portions adjacent the rib elements, said rib elements including two spaced wall portions adjacent the stringer elements, and clips for securing the stringer elements to the rib elements, each clip including a portion lying alongside and secured to one side face of the web portion of the stringer element, a portion lying alongside and secured together with a portion of the stringer element to the skin sheet, and spaced portions lying alongside and secured to the spaced wall portions of the rib elements.

MICHAEL WATTER.